United States Patent [19]

Yasukawa

[11] Patent Number: 4,706,515
[45] Date of Patent: Nov. 17, 1987

[54] MULTI-ARTICULATED ROBOT

[75] Inventor: Kazuyoshi Yasukawa, Nagano, Japan

[73] Assignee: Kabushiki Kaisha Sankyo Seiki Seisakusho, Nagano, Japan

[21] Appl. No.: 905,818

[22] Filed: Sep. 10, 1986

[30] Foreign Application Priority Data

Sep. 10, 1985 [JP] Japan ................................. 200097

[51] Int. Cl.⁴ .................... B25J 17/00; G05G 11/00
[52] U.S. Cl. ........................................ 74/479; 74/640;
74/665 B; 414/744 R; 901/15; 901/21; 901/25
[58] Field of Search ................... 74/640, 665 B, 479;
901/15, 21, 25; 414/744 R, 744 A

[56] References Cited

U.S. PATENT DOCUMENTS

| 4,557,662 | 12/1985 | Terauchi et al. | 414/744 R |
| 4,610,598 | 9/1986 | Hamada et al. | 901/21 X |
| 4,637,771 | 1/1987 | Yasukawa | 901/21 X |

Primary Examiner—Allan D. Herrmann
Attorney, Agent, or Firm—Sughure, Mion, Zinn, Macpeak, and Seas

[57] ABSTRACT

A multi-articulated robot is disclosed which comprises a base; a first arm rotatably supported to said base; a second arm rotatably supported at a forward end of the first arm; a work shaft provided at a forward end of the second arm; belts provided below the first arm and the second arm, respectively; a motor provided at the base for driving the work shaft; a hollow shaft fixed to the base, the hollow shaft rotatably supporting the first arm, and the motor being fixed to the hollow shaft; a rotary shaft rotatably supported in opposition to an output shaft of the motor, the rotary shaft projecting into a space defined below the hollow shaft; a declerator interposed between the rotary shaft and the output shaft of the motor and a pulley provided at a projecting end of the rotary shaft, one of the belts being laid around the pulley. The belt laid around the pulley is of the endless type.

5 Claims, 4 Drawing Figures

FIG. 1
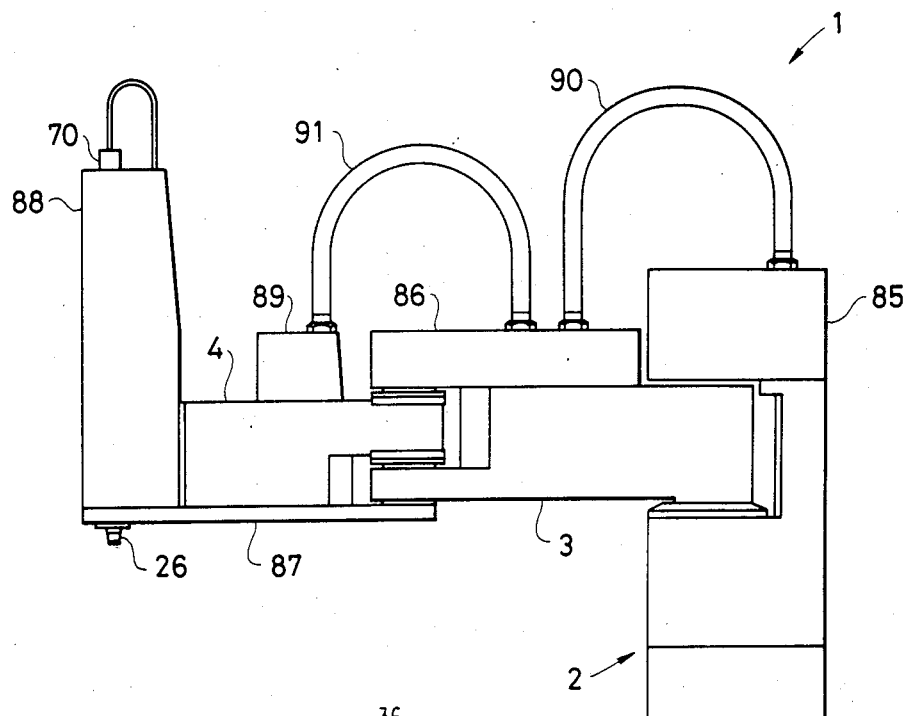
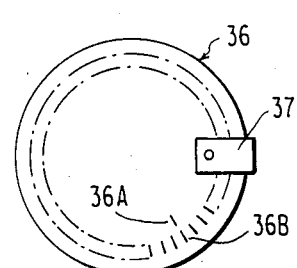
FIG. 4
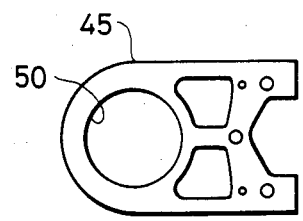
FIG. 3

MULTI-ARTICULATED ROBOT

BACKGROUND OF THE INVENTION

The present invention relates to a multi-articulated robot, and more particularly to a structure of an articulated portion of rotatable arms.

In general, in an articulated robot of this type a plurality of rotatable arms are supported in a linked manner to a base of the robot. Also, the robot is provided with a work head at a forward end of the linked arms. In order to rotate the work head, a rotatable work shaft must be provided at the forward end of the arms and be supplied with a rotatational torque from the robot side.

If a drive source for rotatingly driving the work shaft is provided on the arms, the gravitational force of the drive source acts on the arms as loads. Therefore, there is a restriction in rotating or swivelling the arms at a high speed. Also, a large inertia would be generated so that it is very difficult to position the work head exactly at a desired location.

Accordingly, usually, the drive source of the work shaft is mounted on the base side of the articulated robot. The rotational torque of the drive source is transmitted through an interior of the arms or timing belts, located below the arms, and through a pulley provided at an intermediate position of an articulation shaft supported at both ends.

However, for the purposes of replacing the timing belt by new one, the belt used in the conventional robot is not of the endless type but of the joint type such as turn buckle belt. The joint type belt is laid around pulleys each having a shaft supported at both ends. For this reason, the transmission of rotation is impossible in a range where the joint is in abutment with the pulley. It is impossible to continuously transmit the rotation.

In order to solve the above-noted problem, if the articulation portions are dismounted for the belt replacement or the shaft of each articulation portion is of the cantilever type to open on one side, it is possible to use an endless belt. However, the dismounting operation is intricate and needs a very skillful work, which is unsuitable for the belt replacement. Also, the cantilever type support causes a fluctuation of the shaft and is inferior in stability of the structure.

OBJECT AND SUMMARY OF THE INVENTION

Accordingly, an object of the present invention is to provide a multi-articulated robot in which each articulated portion is supported by a shaft supported at both ends for facilitating an endless belt replacement, with a stability of the support portion of the shaft of the articulated portion, and it is possible to continuously drive the endless belt.

According to the present invention, there is provided a multi-articulated robot which comprises: a base; a first arm rotatably supported to said base; a second arm rotatably supported at a forward end of said first arm; a work shaft provided at a forward end of said second arm; belts provided below said first arm and said second arm, respectively; a drive source provided at said base for driving said work shaft; a hollow shaft fixed to said base, said hollow shaft rotatably supporting said first arm, and said drive source being fixed to said hollow shaft; a rotary shaft rotatably supported in opposition to an output shaft of said drive source, said rotary shaft projecting into a space defined below said hollow shaft; a decelerator interposed between said rotary shaft and said output shaft of said drive source; and a pulley provided at a projecting end of said rotary shaft, one of said belts being laid around said pulley, wherein the belt laid around said pulley is of the endless type.

BRIEF DESCRIPTION OF THE DRAWINGS

FIG. 1 is a side view showing the articulated robot;
FIG. 3 is an enlarged plan view of the supporting plate;
and
FIG. 4 is a top view of a sensor plate in position with a sensor.

DETAILED DESCRIPTION OF THE PREFERRED EMBODIMENTS

Figure 2:
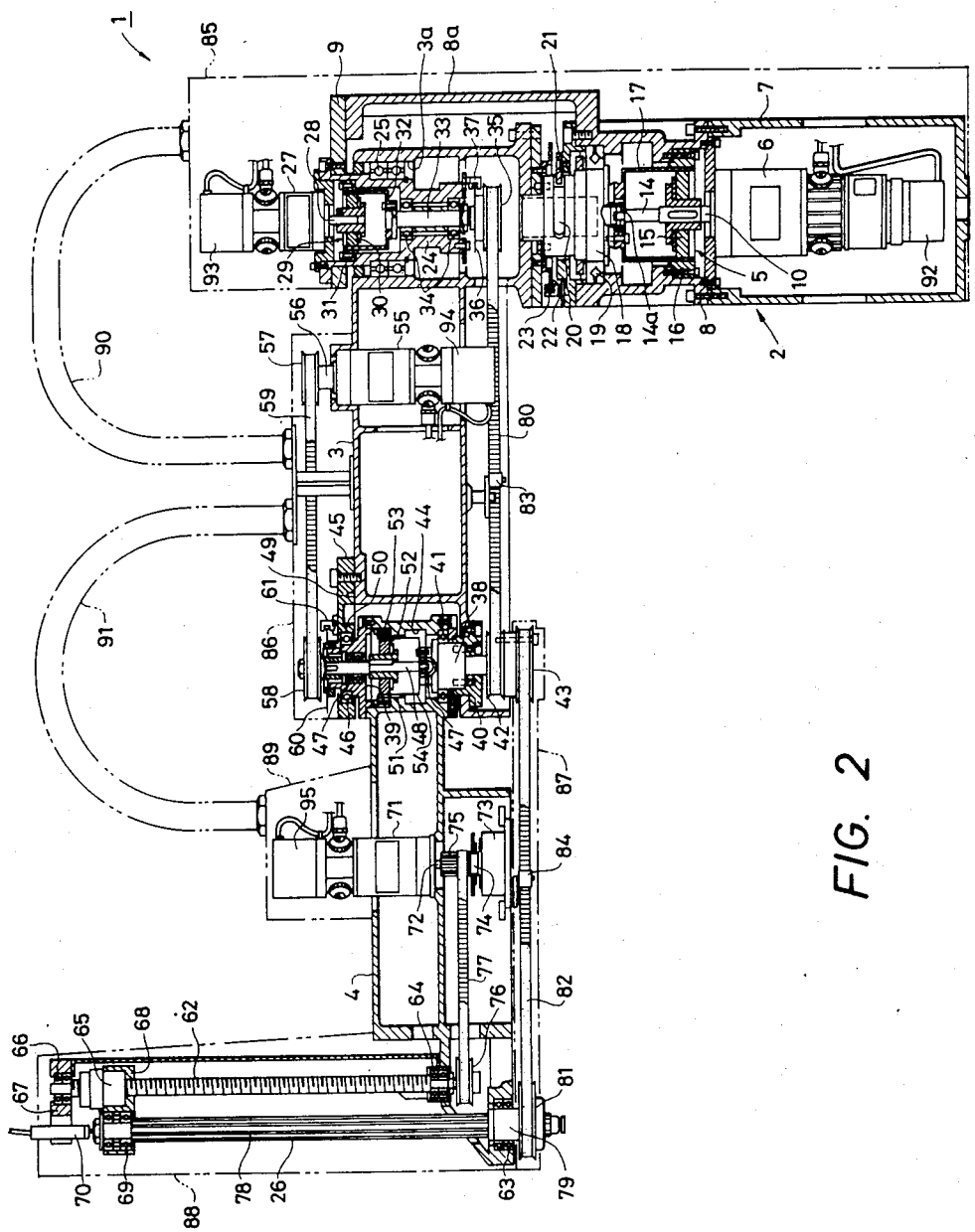
FIG. 2 is an enlarged cross section showing the inside portion of the articulated robot.

FIG. 1 shows the whole arrangement of an articulated robot 1. The articulated robot 1 is provided with a base 2 to be attached to a mounting position, a first arm 3 supported on the base 2 so as to be rotatable about a vertical axial line, and a second arm 4 connected at its rear end portion to the first arm 3 at the forward end portion of the latter so as to be rotatable about another perpendicular axial line.

FIG. 2 shows an interior arrangement of the articulated robot 1.

The base 2 is arranged so as to have a U-shape when viewed from its side and is integrally assembled by three members; a base frame 7, a machinery frame 8, and a holding frame 9. The base frame 7 has a cup-like shape so as to accommodate a driving motor 6 in an inner space thereof. The machinery frame 8 is made hollow so as to accommodate in its inside a harmonic drive type speed reducer or decelerator 5 and to hold the driving motor 6 at its lower end. An output shaft 10 of the motor is coupled with an input shaft 14 of the decelerator 5. The rotation of the input shaft 14 is transmitted with a large deceleration ratio to an output side flexspline 17 disposed between a wave generator 15 and a circular spline 16 fixed to the machinery frame 8. Further, the input shaft 14 is rotatable supported by a bearing 14a. The harmonic mechanism for the reducer 5 is well known in the art.

On the other hand the first arm 3 is supported rotatably relative to the base 2, that is, on the base frame 7, at its rear end lower side portion by a first shaft 18 through a bearing 19, the first shaft 18 being attached at the rotation center of the first arm 3. The first shaft 18 is coupled with the output side flexspline 17 and arranged to rotatably support the input shaft 14 at the central portion of the first shaft 18. A groove 20 is circumferentially formed in the outer peripheral surface of the first shaft 18 within a range of a rotary angle of the first arm 3, and the rotation range of the first arm 3 is restricted by the relationship of abutment between the groove 20 and an abutting member 21 attached to the upper surface of the machinery frame 8. The rotation angle of the first arm 3 is detected electrically by a rotary plate 22 attached on the lower surface of the first arm 3 and a sensor 23 attached on the upper surface of the machinery frame 8.

The holding frame 9 is fixed on a supporting member 8a of the machinery frame 8 and arranged to fix a hollow shaft 24 and a motor 27 for driving a work shaft 26 coaxially with the first shaft 18. The hollow shaft 24 is disposed to face the inside of the rear portion of the first arm 3 and arranged to support a bearing hole 3a at a rear end upper portion of the first arm 3 through a bearing 25. As a result, the first arm 3 is rotatably supported in a so-called double held state, that is, rotatably supported on the machinery frame 8 by the first shaft 18 and on the holding frame 9 by the hollow shaft 24 coaxial with the shaft 18, the lower and upper portions of the first arm 3 respectively. The hollow shaft 24 accommodates in its inside a harmonic drive type decelerator 29. The rotation of an output shaft 28 of the motor 27 is applied to a wave generator 30 of the decelerator 29, transmitted in turn to a flexspline 32 between the wave generator 30 and a circular spline 31 fixed on the hollow shaft 24, and then transmitted to an output side rotary shaft 33. The rotary shaft 33 is rotatably supported by a pair of bearings 34 at the lower portion of the hollow shaft 24 and partly projected from the hollow shaft 24 so as to hold a pulley 35 and a sensor plate 36 by the projecting portion of the rotatary shaft 33. A space for replacement of belts is defined between the lower end of the hollow shaft 24 and the first shaft 18. The sensor plate 36 is provided for detecting the quantity of rotation of the work shaft 26, correspondingly to a photosensor 37 attached on the hollow shaft 24.

The second arm 4 is rotatably supported at its rear end portion by the first arm 3 at its forward end portion through a second shaft 38 and a hollow projecting shaft 39. That is, the second shaft 38 is fixed to the forward lower side portion of the first arm 3 through an attaching seat 40 so as to be rotatable through bearings 41 relative to a hollow hole portion 44 at the rear end of the second arm 4. The second shaft 38 rotatably supports at its lower end portion a pair of relay pulleys 42 and 43. The hollow projecting shaft 39 is fixed to the second arm 4 at the upper surface of the hollow hole portion 44 of the second arm 4 so as to be rotatable through a bearing 46 relative to a supporting plate 45 fixed to the first arm 3 side. The hollow projecting shaft 39 holds a rotary shaft 48 rotatably and coaxially with the second shaft 38 through upper and a lower bearings 47 in the inside of the hollow hole 44. The supporting plate 45 is attached on the upper surface of the forward end side portion of the first arm 3 in a correctly positioned state owing to the fitting of the positioning pins 49 or the like, and holds the bearing 46 by a bearing housing portion 50 of the plate 45 as shown in FIG. 3. The second arm 4 accommodates a harmonic drive type decelerator 51 in the inside of the hollow hole 44. The type decelerator 51 in the inside of the hollow hole 44. The decelerator 51 transmits the rotation of the rotary shaft 48 acting as an input shaft to the second arm 4 with a large deceleration ratio through an input side wave generator 52, an output side circular spline 53 fixed to the hollow hole portion 44, and a fixed side flexspline 54. The driving source for the second arm 4 is, for example, a motor 55 attached to the first arm 3 at its midway. The rotation of an output shaft 56 of the motor 55 is transmitted to the rotary shaft 48 through pulleys 57 and 58, and a belt 59. A disk-like position detecting plate 60 is attached at the upper end portion of the hollow projecting shaft 39, and a sensor 61 is attached to the supporting plate 45 correspondingly to the detecting plate 60.

Next, the second arm 4 rotatably supports at its forward portion the vertical work shaft 26 and a feed screw 62 disposed in parallel to the work shaft 26, through bearings 63 and 64 respectively. The feed screw 62 makes up at its screw portion a screw pair together with a feed nut 65 and is rotatably supported at is upper end portion by a supporting bracket 67 through a bearing 66, the bracket 67 being attached on the upper surface of the second arm 4. The feed nut 65 is linked with the work shaft 26 at its upper end portion through a connector 68 and a bearing 69 provided inside the connector 68 so as to allow the work shaft 26 to rotate. A rotary joint 70 is attached at the upper portion of the work shaft 26 so as to drive an air chuck or the like.

A driving motor 71 for driving the feed screw 62 is attached at substantially the middle portion of the second arm 4, and the rotation of the output shaft 72 of the motor 71 is applied as an input to a harmonic drive type decelerator 73, and transmitted to the feed screw 62 through a hollow output shaft 74 of the decelerator 73, pulleys 75 and 76, and a belt 77. The work shaft 26 is supported by a spline 78 axially movably relative to a spline cylinder 79 so as to receive only rotation, and arranged to hold a working member such as an air chuck or the like at the lower end portion of the work shaft 26. The rotation of the rotary shaft 33 is transmitted to the work shaft 26 successively through an endless belt 80 entrained between the pulleys 35 and 42, and an endless belt 82 entrained between the pulley 43 and a pulley 81 attached on the lower end of the spline tube 79. Pulleys 83 and 84 for adjusting tension are provided at the respective middle portions of the belts 80 and 82.

Belt 59 and belt 82, the work shaft 26 and the feed screw 62, and the motor 71 are respectively covered with covers 86, 87, 88 and 89. The wirings for the motors 55 and 71 are effected by wires passed through flexible tubes 90 and 91 disposed respectively between covers 85 and 86, and between 86 and 89. The flexible tubes 90 and 91 are used also for the wirings for leading the outputs from the sensor 61, etc., to the base 2 side. The motors 6, 27, 55 and 71 are of the type in which the quantity of rotation can be controlled and therefore connected with encoders 92, 93, 94 and 95.

The articulated robot 1 is installed in a working position at the portion of the base 2 so as to perform necessary work owing to the turning movement of the first arm 3 and the second arm 4, and the up/down and rotational movements of the work shaft 26. That is, as the driving motor 6 rotates, the rotation thereof is transmitted to the first shaft 18 after deceleration by the decelerator 5, so that the first arm 3 is driven by the first shaft 18 to perform the turning movement about the axial line of the first shaft 18 and the hollow shaft 24. The turning movement of the second arm 4 is given by the motor 55. That is, the rotation of the motor 55 is given to the rotary shaft 48, decelerated by the decelerator 51, and then transmitted to the output side circular spline 53, so that the second arm 4 performs the turning movement relative to the first arm 3 about the first shaft 38 and the hollow projecting shaft 39 disposed lower and upper portions respectively. The work shaft 26 is positioned at a predetermined position within the operative range owing to the respective turning movements of the first and second arms 3 and 4.

On the other hand, the rotation of the work shaft 26 is given by the motor 27. That is, after decelerated by the decelerator 29, the rotation of the motor 27 is transmitted to the work shaft 26 through the output side rotary shaft 33, the belts 80 and 82, and the spline tube 79. The up/down movement of the work shaft 26 is caused by the motor 71. The rotation of the motor 71 is transmitted to the feed screw 62 through the belt 77, and the feed nut 65 moves up or down in the axial direction of the feed screw 62 depending on the rotating direction of the latter. Thus, the work shaft 26 performs necessary work while performing the up/down and rotating movements. During those movements the rotation is stable and performed smoothly to thereby make it possible to perform positioning under highly accurate control because each of the first and second arms 3 and 4 is supported at its upper and lower portions, that is, in a double supporting state.

Here, the turning movement of the first arm 3 is independent of the rotating movement of the output shaft 33, so that if the motor 27 is stopping, the direction of the work shaft 26 relative to the installed position does not change even if the first arm 3 performs its turning movement. This is because the pulleys 35, 42, 43 and 81 are the same in size with each other, and the belts 80 and 81 are combined with those pulleys in the state of a parallelogram, so as to form a parallel movement mechanism. The endless belts 80 and 82 may be loosened by the adjustment of the attaching positions of the pulleys 83 and 84, so as to make the belts come off downward easily.

The respective quantities of the above-mentioned turning movements and the original positions are detected by the sensors 23, 37 and 61. When over-run must be detected, an additional sensor is provided.

Since the foregoing arrangement is a specific embodiment according to the present invention, the relationship among the parts may be made different from that illustrated in the drawings. For example, the motor 6 may be provided side by side with the first shaft 18 to thereby reduce the height of the base 2. The motor 55 is not limited to be disposed at the middle portion of the first arm 3, but may be attached, for example, at a portion of the holding frame 9 of the base 2. In this case, a coaxial intermediate shaft is disposed at a portion of the rotary shaft 33 for the transmission of the rotation of the motor shaft 56.

The rotary plate 22, the sensor plate 36, the position detecting plate 60, etc., may be constituted by a slit plate, a cam plate, or the like. FIG. 4 illustrates the sensor plate 36. Slits 36A and 36B are formed around the circumference of the plate and photosensor 37 is used to detect the rotation of plate 36. Photosensor 37 is utilized for original position detection and overrun detection of the plate. The relationship between the above-mentioned plates and the sensors 23, 37 and 61 are not limited to so-called contactless switches, but other types of means may be used alternatively.

The following advantages are enjoyable according to the present invention.

Since the rotary shaft projects from an interior of the first arm to the outside and is discontinuous to define a space in cooperation with the first shaft, the belt may be of the endless type so that the rotation transmission may be continuous while facilitating the belt replacement.

Since the hollow shaft functions also as a support shaft for the first arm, the motion of the first arm is stabilized. Since the hollow shaft is stationary, the direction of the work shaft is kept constant irrespective of the rotation of the first arm. Thus, it is possible to readily carry out the orientation control of the work shaft.

Since the reducer is incorporated in an interior of the hollow shaft and the motor for driving the work shaft may be directly connected coaxially therewith, a loss of the rotational drive system may be suppressed and the support structure of the articulation shaft and the drive system may be reasonably arranged. If, as in the prior art, the drive system of the work shaft is provided so that it projects below the first arm on the base side in the same direction as that of the first arm, when a relatively large workpiece is mounted on the work shaft, a part of the work piece would interfere with the drive system during the motion. This disadvantage is overcome by the present invention.

Furthermore, since the hollow shaft shares a support of the first arm, the first arm may be supported at an end of a shaft supported at both ends, on the base side with high stability by the application of the first shaft as described in the embodiment.

I claim:
1. A multi-articulated robot comprising:
 a base;
 a first arm rotatably supported to said base;
 a second arm rotatably supported at a forward end of said first arm;
 a work shaft provided at a forward end of said second arm;
 belts provided below said first arm and said second arm, respectively;
 a drive source provided at said base for driving said work shaft;
 a hollow shaft fixed to said base, said hollow shaft rotatably supporting said first arm, and said drive source being fixed to said hollow shaft;
 a rotary shaft rotatably supported in opposition to an output shaft of said drive source, said rotary shaft projecting into a space defined below said hollow shaft;
 a decelerator interposed between said rotary shaft and said output shaft of said drive source; and
 a pulley provided at a projecting end of said rotary shaft, one of said belts being laid around said pulley, wherein the belt laid around said pulley is of the endless type.

2. The robot of claim 1, wherein said decelerator comprises a harmonic decelerator.

3. The robot of claim 2, wherein said harmonic decelerator includes a wave generator fixed to said output shaft of said drive source, a flexspline fixed to said rotary shaft; and a circular spline fixed to said hollow shaft.

4. The robot of claim 1, wherein a sensor plate is provided to said pulley and a sensor means is provided on said hollow shaft.

5. The robot of claim 4, wherein said sensor means includes a photosensor, and slits are formed equidistantly on a circumference of said sensor plate.

* * * * *